May 18, 1965  R. W. LARSON  3,183,951
CUTTER HEAD ASSEMBLAGE FOR IMPACT SHEARING OF TREE LIMBS
Filed June 11, 1963  4 Sheets-Sheet 1

INVENTOR.
ROBERT W. LARSON
BY
ATTORNEYS

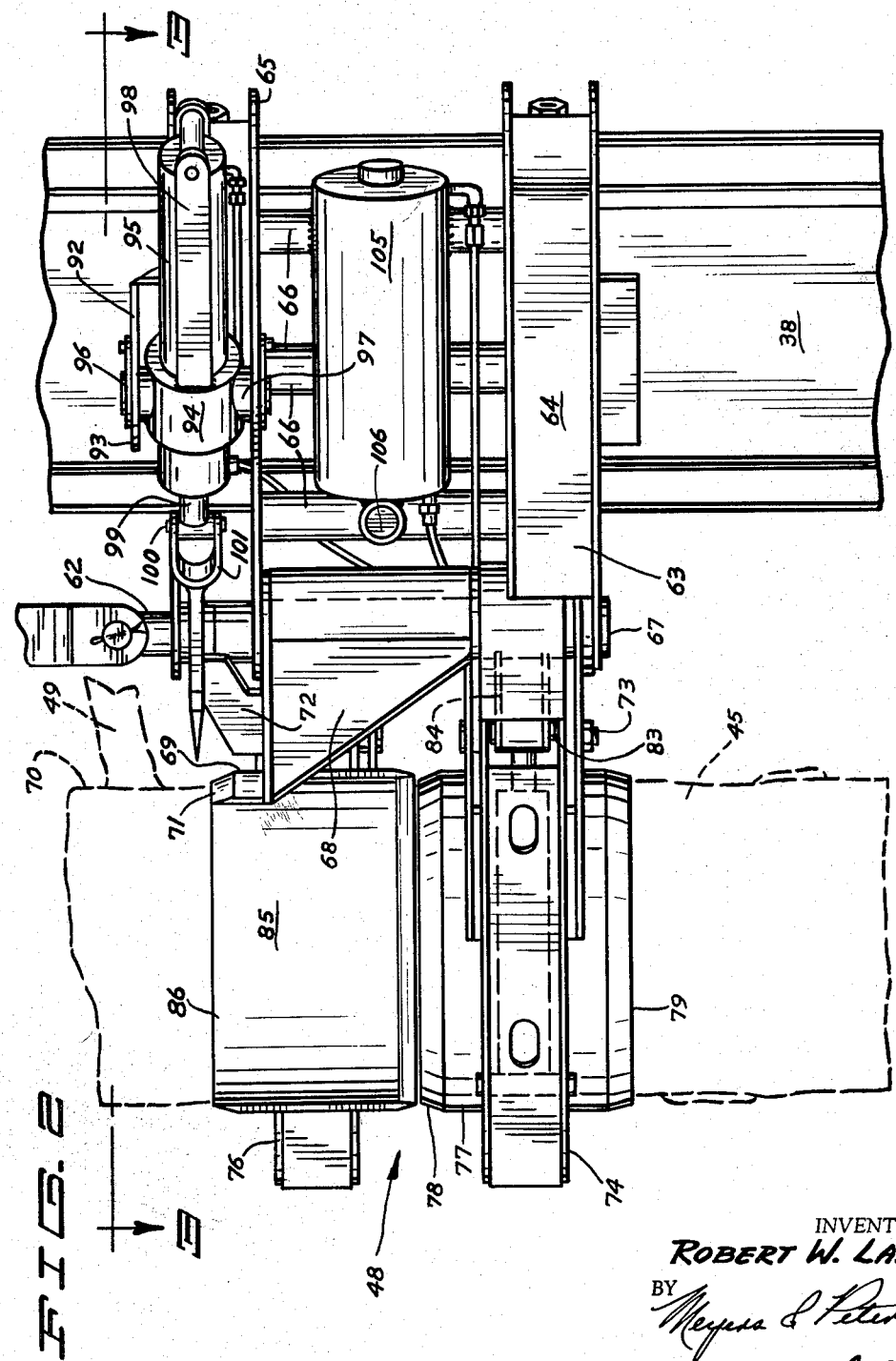

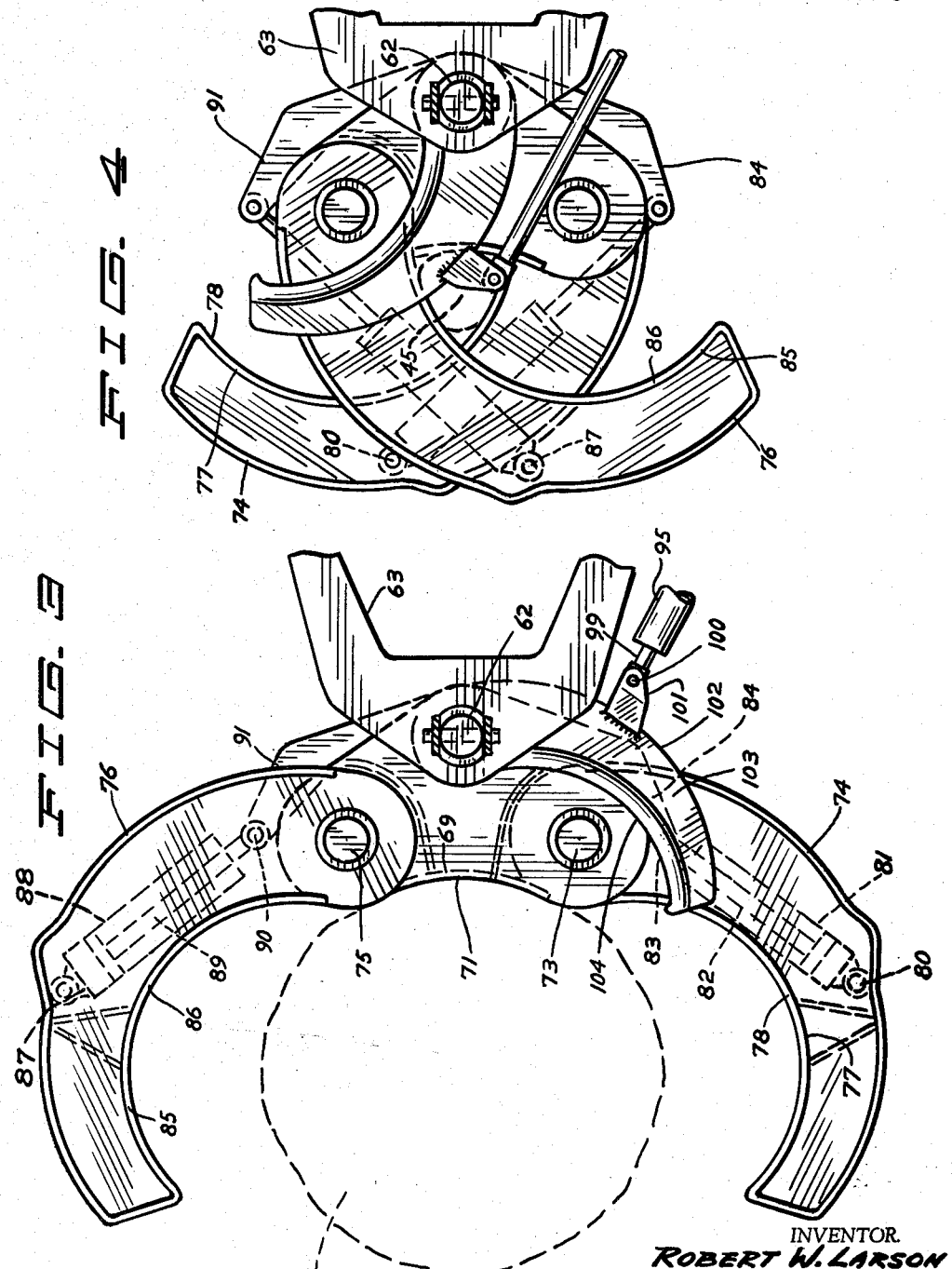

3,183,951
CUTTER HEAD ASSEMBLAGE FOR IMPACT SHEARING OF TREE LIMBS
Robert W. Larson, Ashland, Wis., assignor to Beloit Corporation, Beloit, Wis., a corporation of Wisconsin
Filed June 11, 1963, Ser. No. 287,042
10 Claims. (Cl. 144—3)

This invention relates to the processing of standing trees and more particularly to an assemblage for removing unwanted portions of a tree before it is felled and further processed. Reference is made to patent applications in which the present inventor is co-inventor, to wit: Serial Number 196,195, filed May 21, 1962 and continuations-in-part thereof, Serial Number 291,501, filed June 28, 1963 and Serial Number 285,114, filed June 3, 1963.

In the co-pending cases apparatus is described which provides for a swift delimbing of all the branches of a standing tree. The heavy delimber head has a degree of momentum which shears off the limbs and smaller branches by a force which is largely impact in nature as opposed to a pressing or sawing type cutting action. Of the inventions set forth in said co-pending cases, the swift rise of the delimber causes branches to literally shower down around a standing tree, the entire operation being performed on large trees in a matter of a few seconds. While this novel type of tree processing lends itself to any style of lumbering operation, it has particular significance in conifer tree harvesting wherein selective areas of forests having trees of uniform development are cut and reseeded under the brush created by the delimbing operation. In this type of tree harvesting the randomly disposed cut branches are further broken and compacted where they lie by such means as the tracks of a crawler type vehicle. The brush mat which is formed protects the seedlings and assists in the retention of moisture in the soil.

It is within the contemplation of the present invention and a general object thereof to provide an improved cutter head assemblage for use in impact shearing of tree branches.

A more specific object of the invention is to provide a simple and novel overlapping type of delimber arm mechanism which is strong enough to resist the intense impact forces to which it is subjected, yet is capable of encircling a trunk of a tree and rapidly adjusting to the diminishing diameter of the trunk as the assemblage speeds upwardly.

A further object of the invention is to provide a hydraulic system for the assemblage which can control the rapid engagement and disengagement of the mechanism with a standing tree trunk and which can exert a gripping and holding force at any position along the trunk of a tree.

A still further object of the invention is to provide a tree topping knife which is cooperatively positioned with respect to the delimber arms so as to shear off the top of a tree, while continuing to rigidly hold the remaining standing portion of the tree trunk.

These and other objects and advantages of this invention will more fully appear from the following description, made in connection with the accompanying drawings, wherein like reference characters refer to the same or similar parts throughout the several views and in which:

FIGURE 2 is an enlarged side elevation on the cutter head assemblage showing the delimbing arms in operating position about a tree trunk indicated in dotted lines.

FIGURE 3 is a top plain view of the cutter head assemblage with the delimber arms lying in fully opened position, portions of the assemblage being cut away.

Figure 5:
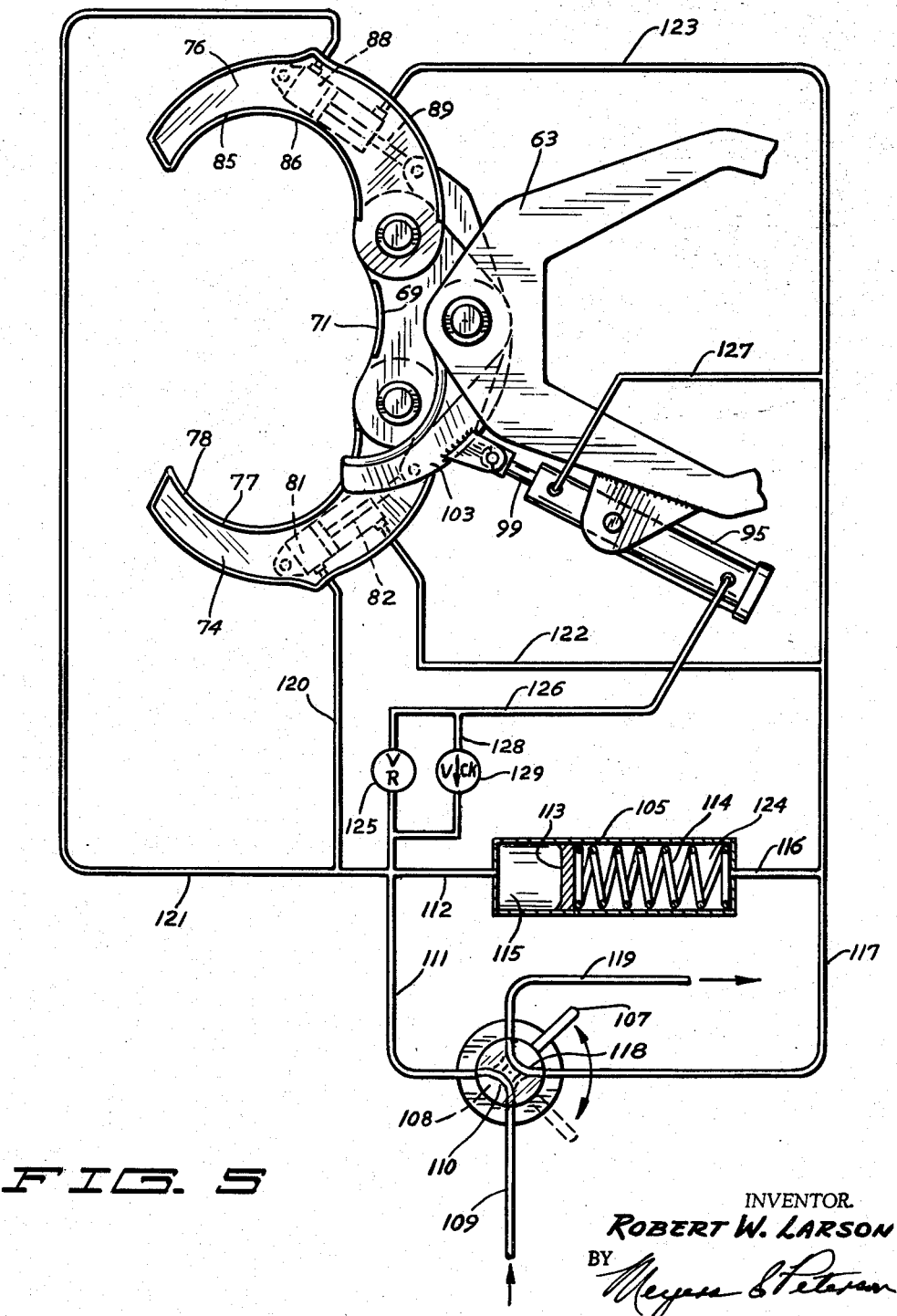

FIGURE 4 is a top plan view of the cutter head assemblage similar to that of FIGURE 3, but showing the arms in converged relation about a diminished portion of a tree trunk, the topping knife being in extended position immediately following the topping operation, and FIGURE 5 is a schematic view of the cutter head assemblage showing the hydraulic operating and control mechanism for the entire assemblage.

Figure 1:
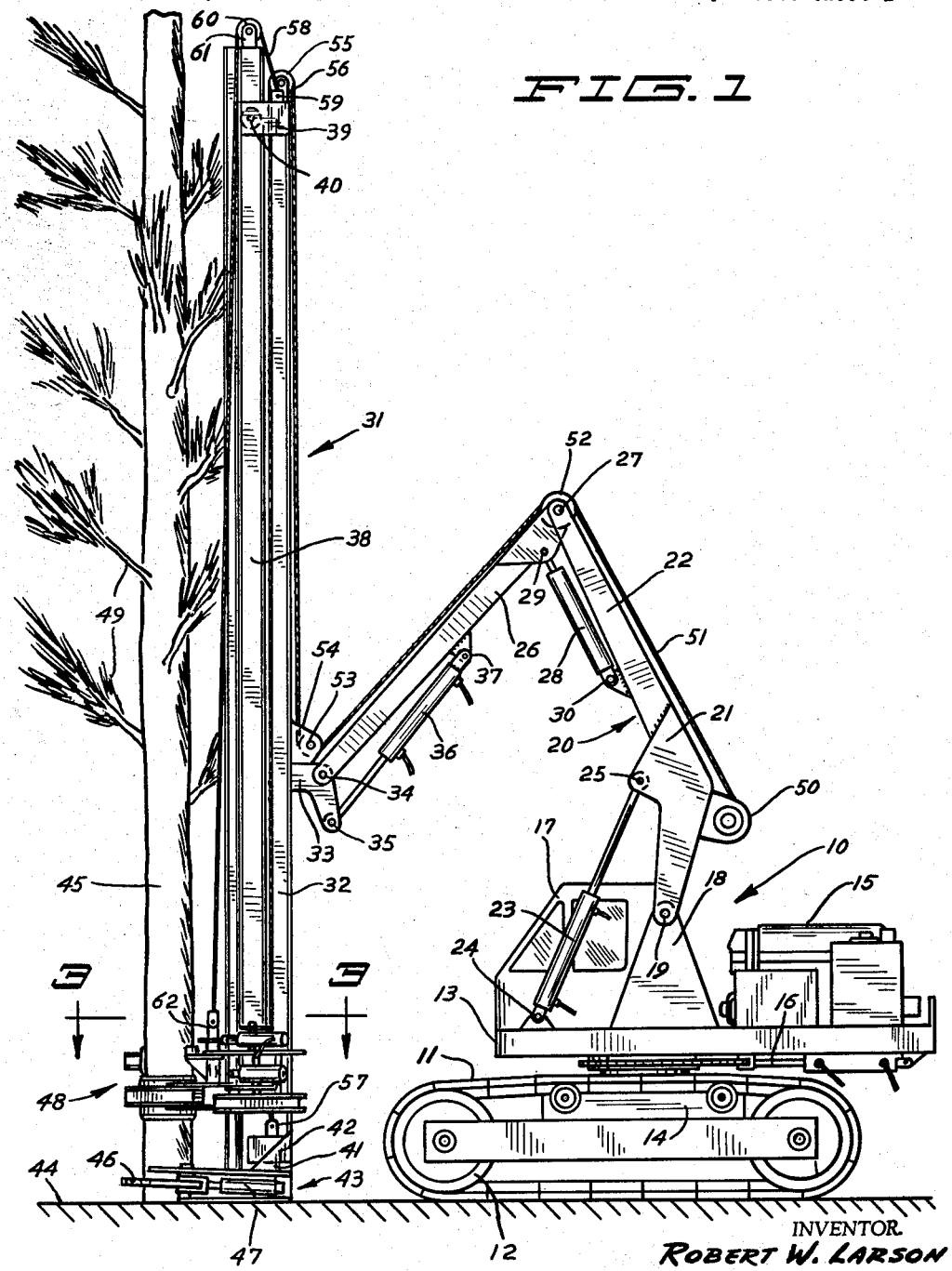
FIGURE 1 is a side elevation of the complete apparatus for delimbing, topping and felling a standing tree, the cutter head being engaged in readiness for the delimbing operation.

With continuing reference to the drawings, and particularly to FIGURE 1, a vehicle is indicated at 10 generally The vehicle is of the crawler type having tracks 11 operated by wheels 12 as shown. A swingable platform 13 is mounted upon the chassis frame 14 which in turn is supported upon the wheels and tracks previously mentioned. A motor 15 for supplying hydraulic pressure and motivating force to the vehicle is mounted at the rear portion of the platform 13. Power means 16 is supplied to rotate the platform 13 together with the delimber apparatus disposed thereon. A cab 17 may be conveniently disposed upon the platform 13 in order to seat an operator who can view the position of the vehicle and the movement of the delimber apparatus. A mounting base 18 is secured to the medial area of platform 13 and has pivotally secured thereto at 19 an articulated reach boom assembly indicated generally at 20. The reach boom assembly has a rear boom section 21 pivotally connected to the pivot 19 and having an upwardly extending arm portion 22 as shown. A hydraulic actuator 23 is pivotally secured at 24 to the platform 13 and also is pivotally secured at 25 to the rear boom 21 as shown. The hydraulic actuator may be a conventional cylinder and piston assemblage being extensible and retractible by means of hydraulic fluid pressure through means not shown.

A second arm or boom 26 is pivotally mounted at 27 to the forward end of the arm 22 and may be rotated about the pivot 27 by means of a hydraulic actuator 28 pivotally secured at 29 to the boom 26 and also at 30 to the rear boom arm 22.

Carried at the end of the boom 26 of the reach boom assembly 20 is a sliding mast and standard assemblage indicated generally at 31. The standard 32 of the assemblage 31 is secured to a crank 33 to effect the mount thereof through pivot connection 34 at the end of the boom 26. Crank 33 is also pivotally secured at 35 to hydraulic actuator 36 which in turn is pivotally mounted at 37 to the end boom 26. Hydraulic actuator 36 in a manner similar to the previously mentioned actuators may be caused to extend and retract through the application of conventional hydraulic fluid lines. The mast 38 may comprise an I-beam or similar structure which is slidably mounted at the forward side of the standard 32. A bracket 39 is secured to the upper end of standard 32 and may be provided with rollers 40 to cooperate with the mast 38 and permit it to slide upwardly and downwardly with respect to the standard 32 while being retained in proximity thereto.

Similarly a bracket 41 may be secured in rearwardly extending manner to the lower end of the mast 38 and may be provided with roller elements 42 for engaging the sides of the I-beam standard 32.

A felling mechanism is shown generally at 43 and this mechanism remains fixedly attached to the lower end of the standard 32 so as to form a base member to contact the ground 44 adjacent a standing tree 45 as shown. The felling mechanism 43 has a severing blade means 46 and hydraulic actuating means 47 associated therewith. Details of suitable tree felling means are set forth in the co-pending applications mentioned earlier in this specification.

The cutter head assemblage which comprises the present invention is indicated generally at 48. The assemblage is secured to the lower portion of the mast 38 and is adapted to slide therewith vertically against the standard 32 when it is desired to remove the limbs 49 from the standing tree 45.

It is contemplated that a number of mechanisms may be employed for effecting the extension of mast with respect to the standard 32. However, there is shown in FIGURE 1 a relatively simple means of accomplishing the extension which utilizes cable members in the manner to be presently described. A winch or other means for rapidly retracting cable members is shown at 50 and is mounted to the rear boom 21 as shown. The cable 51 extends forwardly along the rear boom arm 22 and is trained around a pulley 52 which may conveniently coincide axially with the pivot point 27. The cable 51 then extends along the end boom 26 and is trained about a pulley 53 which is rotatably mounted on bracket means 54 fixedly secured to the standard 32. Cable 51 then extends upwardly along the rear side of standard 32 and is trained about pulley 55 rotatably mounted in bracket 56 at the upper end of standard 32. From this position the cable 51 extends downwardly to the lower end of the mast 38 where it is secured to anchor 57 which in turn is affixed to the bracket 41 and the lower end of the mast 38. It may be readily seen that retraction of the cable 51 will cause the entire mast 38 to be projected upwardly with respect to the standard 32 until the bracket 41 abuts the bracket 39.

A further cable 58 is anchored at 59 to the upper end of the standard 32 and is trained over a pulley 60 which in turn is rotatably mounted to bracket 61. Bracket 61 in turn is mounted fixedly at the top of the mast 38. The cable 58 extends downwardly from pulley 60 along the forward edge of the mast 38 and is anchored to lift means 62 which in turn supports the cutter head assemblage 48 as shown.

As described in the previous co-pending cases, the rise of the mast 38 through retraction of cable 51 causes the cutter head assemblage 48 to rise with respect to the mast 38. Since the mast 38 is also rising with respect to the standard 32, there is a compound movement which will place the cutter head assemblage 48 at the top of the mast 38 at the same time that the mast 38 reaches the uppermost position with respect to the standard 32.

A detailed disclosure of the cutter head assemblage 48 utilized with the previously described apparatus will now be set forth. Referring particularly to FIGURES 2, 3 and 4, the cutter head assemblage generally shown at 48 has a mounting frame 63 which in turn is bolted or otherwise secured to the mast 38 adjacent its lower end as previously described. Frame 63 has a base 64 and a top plate 65 suitably braced by a plurality of upright spacer members 66 as shown. The lift means 62 may constitute a rod which extends through the mounting frame 63 and terminates in a head 67 with the under side thereof as shown in FIGURE 2. The frame 63 has a forwardly extending brace 68 to which is secured an upstanding pressure plate 69 suitably curved to abut against the side 70 of tree trunk 45. The pressure plate 69 is provided with an impact edge 71 which is capable of shearing branches 49 which may lie in the projected upward path of the pressure plate 69.

Also providing an integral part of the frame 63 is a knife support 72, the function of which will be described subsequently. Forwardly and somewhat to each side of the lift means 62 is a pivot bolt 73 to which is pivotally mounted the lower delimber arm 74. Similarly, a pivot bolt 75 is positioned vertically and somewhat forwardly and to the side of lift means 62 for pivotally mounting the upper delimber arm 76 as more clearly shown in FIGURES 3 and 4. The delimber arm 74 is provided with a shearing blade 77 which terminates upwardly in an impact edge 78 for shearing or chopping limbs 49 from the trunk of a tree 45, when swiftly raised along the trunk of a tree. The blade 77 is curved to present a concave surface toward the three trunk 45 as shown in FIGURE 3. The bottom edge 79 of the blade 77 may also constitute an impact edge to sever remaining limb stumps upon the downward rapid descent of the cutter head assemblage. Again referring to FIGURE 3, the lower delimber arm 74 has a vertical pivot pin 80 housed within the hollow structure of the arm upon which is mounted the cylinder 81 of a hydraulic actuator. An extensible piston element 82 is pivotally secured to the pin 83 which in turn is secured to the frame 63 on a bracket means 84 as shown in FIGURES 2, 3 and 4. The pivot pin 83 lies laterally outward of the pivot pin 73 so that when the hydraulic actuator comprising the piston 82 and the cylinder 81 is retracted, the delimber arm 74 will assume the position shown in FIGURE 3 and when the cylinder and piston are extended, the delimber arm 74 will assume the position shown in FIGURE 4.

In a similar manner the upper delimber arm 76 has an outwardly extending shearing blade 85 which is concavely formed toward the tree trunk 45 and is offset above the blade 77 and generally opposed thereto. The concave blade 85 terminates upwardly in an impact edge 86 which, like the impact edges 78 and 71, are designed to shear or cleave by momentum limbs and branches which project outwardly from the trunk of a standing tree. Secured vertically at a medial internal portion of the delimber arm 76 is a pivot pin 87. The forward end of hydraulic cylinder 88 is pivotally mounted on the pin 87 and has a piston element 89 extending rearwardly therefrom and secured to pivot pin 90 which in turn is vertically mounted upon bracket means 91 forming a part of the supporting frame 63. Here again the pivot pin 90 is laterally and outwardly spaced from the pivot pin 75 so that retraction of the hydraulic cylinder 88 and piston 89 will cause the delimber arm 76 to be withdrawn to the open position of FIGURE 3 while extension of the cylinder and piston will cause the delimber arm to close in the manner shown in FIGURE 4. It will be perceived that the offset relation of the delimber arms permits the arms to pass by one another and encircle a tree trunk 45 in hugging engagement. At the same time the tree trunk is pulled inwardly to contact the pressure plate 69. The impact edges 78 and 86 of the respective delimber arms 74 and 76 cooperate with the impact edge 71 of the pressure plate 69 to constitute working edges for the complete circumference of the tree trunk.

At the upper portion of the frame 63 and mounted on the plate 65 thereof, is a bracket 92 as shown in FIGURE 2. The bracket 92 has a flange 93 which overlies the plate 65. A pivot mount 94 encircles a hydraulic cylinder 95 and is provided with opposed pivot stub shafts 96 and 97 which are respectively rotatably received in the flange 93 and plate 65. The hydraulic cylinder 95 is further braced a yoke 98 which is secured to the pivot mount 94 and extends around longitudinally and to the rear of the cylinder 95. A piston rod 99 lies in extensible relation forwardly of the cylinder 95 and is pivotally secured at 100 to a yoke 101 which in turn is secured as by welding to the rear edge 102 of topping knife 103. The topping knife 103 has a forward knife edge 104 and is pivotally mounted at its inner end upon the lift rod 62 as shown in FIGURES 3 and 4. The topping knife 103 lies in frictional engagement with the blade support 72 so that as it is projected laterally across the diminished trunk of a tree as shown in FIGURE 4, the blade may be maintained in close clearance with the impact edge 86 of the upper delimber arm 76. The upper blade 85 thus becomes an anvil or opposed jaw to balance the force of the topping knife as it is forced through the trunk 45 at the top of the tree.

A hydraulic accumulator 105 is mounted on the supporting frame 63 at 106 and the function thereof will be described presently in connection with the operation and control of the cutter head assemblage. Referring now to FIGURE 5, the delimber arms 74 and 76 are shown schematically in open position pivoted divergently with respect to mounting frame 63. Assuming that the cutter head assemblage 48 has been brought up to the front of a tree 45 as shown in FIGURE 1, the operator will advance a valve handle 107 to the full line position of FIGURE 5 to rotate valve core 108 to the full line position there set forth. Hydraulic fluid will then pass from the pressurized fluid line 109 through the valve conduit 110 and thence to the supply line 111. From the supply line 111, several branch lines carry fluid at a predetermined low pressure to various elements in the system. The branch line 112 connects with hydraulic accumulator 105 and cause the piston 113 to press against the compression spring 114 to enlarge the fluid chamber 115 with a supply of hydraulic fluid. At the same time fluid trapped rearwardly of the piston 113 will be forced through the line 116 into the main line 117 and thence to the valve conduit 118 from which it will pass to the hydraulic return line 119.

The low pressure hydraulic supply through the line 111 also furnishes fluid through the line 120 to exert pressure against the piston rod 82 and the forward end of the cylinder 81 in the delimber arm 74. Extension of the cylinder will cause the delimber arm 74 to converge toward the opposite delimber arm 76. Also connected to the supply line 111 is the conduit 121 which connects with the forward end of cylinder 88 in the delimber arm 76. The force exerted upon piston rod 89 will cause inward movement of the delimber arm 76 toward the opposed arm 74. As previously described, the convergent movement and force exerted upon a tree trunk will bring the concave blades 77 and 85 into convergence and will also press the pressure plate 69 simultaneously against the side wall of a tree trunk. The predetermined pressurized fluid will therefore cause the engagement of the delimber arms and the simultaneous accumulation of pressurized fluid in chamber 115 of accumulator 105. When pressure balance has been attained, the valve handle 107 is moved to a neutral position intermediate the full line position and the dotted line position. All fluid flow is thus restricted and continuing pressure is exerted upon the delimber arms 74 and 76.

At this point the instantaneous upward projection of the cutter head assemblage is effected and the impact edges 78, 86 and 71 perform the impact shearing of the tree limbs 49. The accumulator 105 supplies pressurized fluid to the forward portions of the respective arm cylinders so that continuing convergent movement and pressure is exerted by the delimber arms upon the diminishing diameter of the tree trunk. It will be observed that fluid forced from the rearmost portions of the respective cylinders 81 and 88 pass respectively through the lines 122 and 123 into the rear chamber 124 of the accumulator 105. Hence, there is no need to provide for relief of bypassed fluid through the valve 108 at this point. The delimber arms will have crossed over in the relation shown in FIGURE 4 and the entire assemblage will now be at its uppermost position near the top of a tree.

The valve arm 107 is again moved to its full line position and fluid of higher pressure (e.g. 1500 pounds per square inch) is now supplied through the line 109. The delimber arms 74 and 76 cannot move, but are made to grip the diminishing tree trunk 45 more securely under the influence of the increased fluid pressure. The accumulator again refills, causing the chamber 115 to enlarge under the high pressure fluid influence. The relief valve 125 which lies in fluid line 126 is preset to prevent passage of fluid less than the predetermined high pressure. As the predetermined pressure is exceeded, hydraulic fluid passes through the relief valve 125 and the line 126 into the rear portion of cylinder 95 thereby causing projection of the piston rod 99 and actuation of the topping knife 103. The knife traverses the area encompassed by the delimber arms and quickly shears off the top of the tree trunk 45 in the manner shown in FIGURE 4.

The valve arm 107 is now moved to the dotted line position and low pressure hydraulic fluid is caused to pass from the line 109 through the valve conduit 118 (dotted line position) into the common line 117 from which it discharges through the conduit 116 to replenish the expanding space 124 rearwardly of the piston 113 in accumulator 105. Similarly low pressure hydraulic fluid is supplied through the conduits 122 and 123 to reverse the flow of fluid into the cylinders 81 and 88. Still further low pressure fluid now enters conduit 127 which connects with the forward portion of cylinder 95 causing retraction of piston rod 99 and topping knife blade 103. Fluid from the rear of the cylinder 95 is returned through the conduit 126 and is by-passed through parallel conduit 128 and check valve 129. All of the reversely returned fluid now passes from the line 111 through the valve 108 (dotted line position) and into the return line 119.

Following the retraction of the topping knife 103 and the delimber arms, low pressure fluid can again be forced into the forward areas of arm cylinders 81 and 88 and also into accumulator 105. A finishing delimbing operation can then be effected upon the down stroke of the cutter head assemblage as it is desired and additionally the delimber arms may be caused to grasp the tree trunk at any convenient position where the cutter head assemblage may be stopped. The tree trunk is thus controlled at all times during the delimbing and topping operation and subsequent thereto.

It will, of course, be understood that various changes may be made in the form, details, arrangements, and proportions of the parts without departing from the scope of this invention as set forth in the appended claims.

What is claimed is:

1. A cutter head assemblage for delimbing standing trees which comprises:
   (a) a mounting frame adapted to be positioned adjacent the trunk of a tree;
   (b) a first delimbing arm swingably mounted on said frame and having a shearing blade concavely curved toward the tree trunk, said shearing blade being rigid and fixed to said first delimbing arm;
   (c) a second delimbing arm swingably mounted on said frame and having a shearing blade concavely curved toward the tree trunk at a position offset below and generally opposed to said first delimbing arm, said shearing blade being rigid and fixed to said second delimbing arm;
   (d) each of said shearing blades having an upper horizontal impact edge;
   (e) means adapted to bias said delimbing arms convergently into engagement with the tree trunk; and
   (f) lift means secured to said mounting frame for swiftly raising the entire assemblage vertically along the trunk of a standing tree so as to shear the branches therefrom by impact between the impact edges of said shearing blades and said branches.

2. A cutter head assemblage for delimbing standing trees which comprises:
   (a) a mounting frame having a pressure plate adapted to be positioned against the trunk of a tree;
   (b) a first delimbing arm swingably mounted on said frame and having a shearing blade concavely curved toward the tree trunk, said shearing blade being rigid and fixed to said first delimbing arm;
   (c) a second delimbing arm swingably mounted on said frame and having a shearing blade concavely curved toward the tree trunk at a position offset below and generally opposed to said first delimbing arm, said shearing blade being rigid and fixed to said second delimbing arm;

(d) each of said shearing blades and said pressure plate having an upper horizontal impact edge;

(e) a means adapted to bias said delimbing arms convergently into engagement with the tree trunk; and (f) lift means secured to said mounting frame for swiftly raising the entire assemblage vertically along the trunk of a standing tree so as to shear the branches therefrom by impact between the impact edges of said shearing blades and said branches.

3. A cutter head assemblage for delimbing standing trees which comprises:

(a) a mounting frame having a pressure plate adapted to be positioned against the trunk of a tree;

(b) a first delimbing arm pivotally mounted on said frame and having an outwardly extending shearing blade concavely curved toward the tree trunk, said shearing blade being rigid and fixed to said first delimbing arm;

(c) a second delimbing arm pivotally mounted on said frame at a position below and horizontally spaced from that of said first delimbing arm and having an outwardly extending shearing blade concavely curved toward the tree trunk in opposed relation to that of the first delimbing arm, said shearing blade being rigid and fixed to said second delimbing arm;

(d) each of said shearing blades and said pressure plate having an upper horizontal impact edge and collectively defining an expansible and contractible delimber mechanism for circling the variable dimensions of tree trunks;

(e) means adapted to bias said delimbing arms convergently into engagement with a tree trunk; and (f) lift means secured to said mounting frame for swiftly raising the entire assemblage vertically along the trunk of a standing tree so as to shear the branches therefrom by impact between the impact edges of said shearing blades and said branches.

4. A cutter head assemblage for delimbing standing trees which comprises:

(a) a mounting frame having a pressure plate adapted to be positioned against the trunk of a tree;

(b) a first delimbing arm pivotally mounted on said frame and having an outwardly extending shearing blade concavely curved toward the tree trunk, said shearing blade being rigid and fixed to said first delimbing arm;

(c) a second delimbing arm pivotally mounted on said frame at a position below and horizontally spaced from that of said first delimbing arm and having an outwardly extending shearing blade concavely curved toward the tree trunk in opposed relation to that of the first delimbing arm, said shearing blade being rigid and fixed to said second delimbing arm;

(d) each of said shearing blades and said pressure plate having an upper horizontal impact edge and collectively defining an expansible and contractible delimber mechanism for circling the variable dimensions of tree trunks;

(e) a pair of hydraulic actuators respectively connected to said arms and to said mounting frame and being capable of effecting the expansion and contraction of said mechanism; and (f) lift means secured to said mounting frame for swiftly raising the entire assemblage vertically along the trunk of a standing tree so as to shear the branches therefrom by impact between the impact edges of said shearing blades and said branches.

5. A cutter head assemblage for delimbing and topping standing trees which comprises:

(a) a mounting frame adapted to be positioned adjacent the trunk of the tree;

(b) a first delimbing element swingably mounted on said frame and having a blade portion with an upwardly directed impact edge concavely curved toward the tree trunk, said blade portion being rigid and fixed to said first delimbing element;

(c) a second delimbing element swingably mounted on said frame and having a blade portion with an upwardly directed impact edge concavely curved toward the tree trunk at a position offset below and generally opposed to said first delimbing element, said blade portion being rigid and fixed to said second delimbing element;

(d) means adapted to bias said delimbing elements convergently into engagement with the tree trunk;

(e) a topping knife shiftably mounted on said frame and having a sharp edge directed transversely toward said tree trunk at a position above said delimbing elements;

(f) lift means secured to said mounting frame for swiftly raising the entire assemblage vertically along the trunk of a standing tree so as to shear the branches therefrom by impact between the impact edges of said shearing blades and said branches; and (g) power means for forcibly shifting said topping knife transversely through the tree trunk to sever the top portion therefrom.

6. A cutter head assemblage for delimbing and topping standing trees which comprises:

(a) a mounting frame adapted to be positioned adjacent the trunk of the tree;

(b) a first delimbing element swingably mounted on said frame and having an integral portion with an upwardly directed impact edge concavely curved toward the tree trunk;

(c) a second delimbing element swingably mounted on said frame and having an integral portion with an upwardly directed impact edge concavely curved toward the tree trunk at a position offset below and generally opposed to said first delimbing element;

(d) means adapted to bias said delimbing elements convergently into engagement with the tree trunk;

(e) a topping knife pivotally mounted on said frame and having a sharp edge directed transversely toward said tree trunk at a position above said delimbing elements and opposed to said first delimbing element;

(f) lift means secured to said mounting frame for swiftly raising the entire assemblage vertically along the trunk of a standing tree so as to shear the branches therefrom by impact between the impact edges of said shearing blades and said branches; and (g) power means for forcibly pivoting said topping knife transversely through the tree trunk in a plane closely above that of the impact edge of said first delimbing element to sever the top of the tree trunk.

7. A cutter head assemblage for delimbing standing trees which comprises:

(a) a pair of delimber arms, each having upwardly directed impact edges adapted to cooperatively oppose and encircle the trunk of a tree, said impact edges being rigid and fixed to said delimber arms;

(b) hydraulic means adapted to exert converging force upon said delimber arms;

(c) a hydraulic accumulator connected to said hydraulic means and adapted to be charged by hydraulic fluid of predetermined pressure applied to said hydraulic means; and (d) lift means secured to said assemblage for swiftly raising the same vertically along the trunk of a standing tree, said accumulator causing said hydraulic means to progressively converge the pair of delimber arms as the encircled trunk becomes smaller, whereby to shear the branches from the lower to the upper part of the tree by impact between the impact edges of said shearing blades and said branches.

8. A cutter head assemblage for delimbing and topping standing trees which comprises:

(a) a pair of delimber arms, each arm having upwardly directed impact edges adapted to cooperatively oppose and encircle the trunk of a tree, said impact edges being rigid and fixed to said delimber arms;

(b) hydraulic arm operating means adapted to exert converging force upon said delimber arms for hugging engagement with the tree trunk;

(c) a topping knife shiftably mounted above said pair of delimber arms and normally retracted laterally from said impact edges;

(d) lift means secured to said assemblage for swiftly raising the same vertically along the trunk of a standing tree so as to shear the branches therefrom by impact between the impact edges of said shearing blades and said branches;

(e) hydraulic power means for forcibly shifting said topping knife transversely through the tree trunk to sever the top portion therefrom; and (f) a hydraulic accumulator connected to said hydraulic arm operating means and adapted to be charged by hydraulic fluid of predetermined pressure applied to said arm operating means, said accumulator causing said arm operating means to progressively converge the pair of delimber arms in the hugging engagement as the encircled trunk becomes smaller, whereby to shear by impact the branches from the lower to the upper part of the tree.

9. A cutter head assemblage for delimbing and topping standing trees which comprises:

(a) a pair of delimber arms, each having upwardly directed impact edges adapted to cooperatively oppose and encircle the trunk of a tree, said impact edges being rigid and fixed to said delimber arms;

(b) hydraulic arm operating means adapted to exert converging force upon said delimber arms for hugging engagement with the tree trunk;

(c) a topping knife shiftably mounted above said pair of delimber arms and normally retracted laterally from said impact edges;

(d) lift means secured to said assemblage for swiftly raising the same vertically along the trunk of a standing tree so as to shear the branches therefrom by impact edges of said shearing blades and said branches;

(e) hydraulic power means for forcibly shifting said topping knife transversely through the tree trunk to sever the top portion therefrom;

(f) a hydraulic accumulator connected to said hydraulic arm operating means and adapted to be charged by hydraulic fluid of predetermined pressure applied to said arm operating means, said accumulator causing said arm operating means to progressively converge the pair of delimber arms in the hugging engagement as the encircled trunk becomes smaller;

(g) a fluid conduit interconnecting said hydraulic arm operating means and said hydraulic power means; and (h) a relief valve set at a higher pressure than said predetermined pressure which is applied to said arm operating means and being interposed in said fluid conduit, whereby said higher pressure will operate the topping knife while the lower predetermined pressure will maintain said delimber arms in hugging engagement with the standing tree trunk.

10. The cutter head assemblage as set forth in claim 1 being particularly characterized in that said mounting frame has a rigid shearing blade fixed thereto with the blade being concavely curved toward the tree trunk.

References Cited by the Examiner

UNITED STATES PATENTS

| | | | |
|---|---|---|---|
| 2,583,971 | 1/52 | Schuff | 144—3.4 XR |
| 2,707,008 | 4/55 | Bannister. | |
| 2,948,311 | 8/60 | McCollum. | |
| 2,981,301 | 4/61 | Busch et al. | 144—3.4 |

ANDREW R. JUHASZ, *Primary Examiner.*

DONALD R. SCHRAN, WILLIAM W. DYER, JR.,
*Examiners.*